United States Patent
Zhang et al.

(10) Patent No.: US 8,144,275 B2
(45) Date of Patent: Mar. 27, 2012

(54) THERMAL TUNING GLAZING STRUCTURES COMPRISING A CHOLESTERIC LIQUID CRYSTAL

(75) Inventors: Hailiang Zhang, Bedford, OH (US); Chenhui Wang, Stow, OH (US)

(73) Assignee: LXD Research & Display, LLC, Raleigh, NC (US)

( * ) Notice: Subject to any disclaimer, the term of this patent is extended or adjusted under 35 U.S.C. 154(b) by 391 days.

(21) Appl. No.: 12/603,814

(22) Filed: Oct. 22, 2009

(65) Prior Publication Data
US 2011/0096253 A1    Apr. 28, 2011

(51) Int. Cl.
*G02F 1/1335* (2006.01)
*G02F 1/133* (2006.01)

(52) U.S. Cl. ............... 349/16; 349/20; 349/115

(58) Field of Classification Search .......... 349/16, 349/20, 115
See application file for complete search history.

(56) References Cited

U.S. PATENT DOCUMENTS

| | | | |
|---|---|---|---|
| 4,750,814 A * | 6/1988 | Suzuki | 349/16 |
| 4,994,204 A | 2/1991 | Doane et al. | |
| 5,940,150 A | 8/1999 | Faris et al. | |
| 6,239,778 B1 | 5/2001 | Palffy-Muhoray et al. | |

OTHER PUBLICATIONS

Dirk J. Broer, Jan Boven, Grietji N. Mol, "In-situ photopolymerization of oriented liquid-crystalline acrylates", Makromol. Chem. 190, 2255-2268 (1989).
Jinbao Guo, Jie Sun, Kexuan Li, Hui Cao and Huai Yang, "Reflectance properties of polymer-stabilised cholesteric liquid crystals cells . . . ", Liq. Cryst. 35(1): 87-97 (2008).
De Gennes, P.G. and Prost,J., "The physics of liquid crystals", p. 263-266, second edition, Oxford Science Publications (1993).
Jun Li, Sebastian Gauza, and Shin-Tson Wu, "Temperature effect on liquid crystal refractive indices," J. Appl. Phys. 96, 19-24. 15, (1996).
F. Zhang and D.-K. Yang, "Temperature dependence of pitch and twist elastic constant in a cholesteric to smectic A phase transition," Liq. Cryst. 29, 1497-1501 (2002).
Dong-Feng Gu et. al., "Dual Frequency Liquid Crystal Devices for Infrared Electro-Optical Applications", SPIE Proc. 4799, 37-47 (2002).
Yuhua Huang, et. al., "Tuning photonic band gap in cholesteric liquid crystals by temperature-dependent dopant solubility", Opt. Express 14, 1236-1242 (2006).
Guohui Pan, et. al., "A polymer stabilized liquid crystal film with thermal switching characteristics between . . . ", Optical Materials, vol. 31, Issue 8,1163-1166 (2009).
D.J. Broer, J. Lub, G.N. Mol, "Wide-band reflective polarizers from cholesteric polymer networks with a pitch gradient", Nature 378, 467-469 (1995).
Dirk J. Broer, et. al., "Photo-Induced Diffusion in Polymerizing Chiral-Nematic Media", Adv. Mater. 11, 573-578, (1999).
Corinne Binet, Michel Mitov,Monique Mauzac, "Switchable broad-band light reflection in polymer-stabilized cholesteric liquid crystals", J. Appl. Phys., 90, 1730-1734, (2001).
Jinbao Guo,et. al., "Effect of Specific Rotation of Chiral Dopant and Polymerization Temperature on . . . ", Journal of Polymer Science: Part B, vol. 46, 1562-1570 (2008).

* cited by examiner

*Primary Examiner* — James Dudek

(57) ABSTRACT

Disclosed are thermal tuning glazing structures for selectively reflecting electromagnetic radiation for use in dynamically controlling electromagnetic radiation flow in various applications such as intelligent energy saving windows. The thermal tuning glazing structure comprises one or more cholesteric liquid crystal (CLC) panels, each CLC panel comprising a CLC material, the CLC material being in a planar texture at least at one temperature, having a pitch that changes with temperature, and having a broad reflection band.

21 Claims, 7 Drawing Sheets

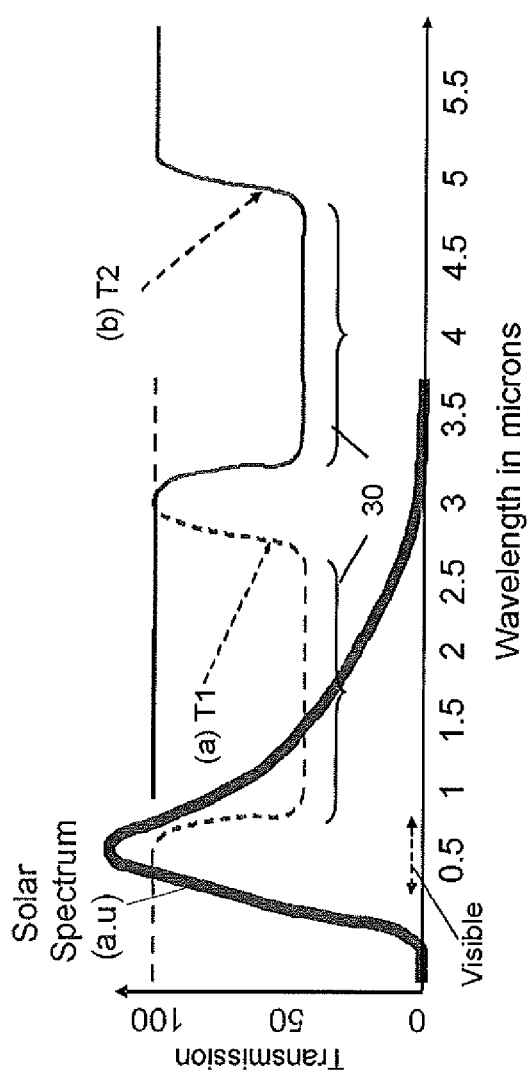
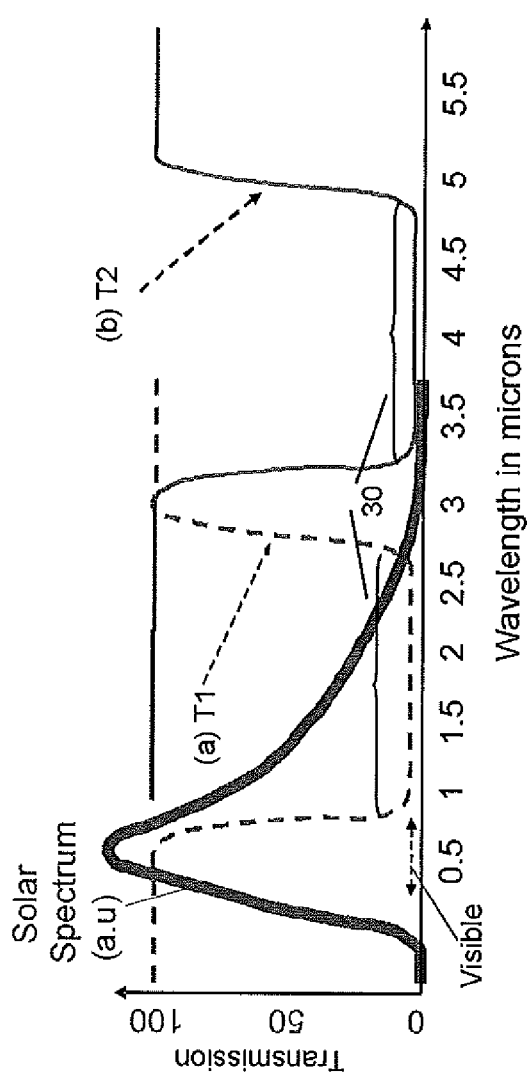

THERMAL TUNING GLAZING STRUCTURES COMPRISING A CHOLESTERIC LIQUID CRYSTAL

FIELD OF THE INVENTION

This invention generally relates to a glazing structure, particular to a thermal tuning glazing structure, and more particularly to a thermal tuning glazing structure comprising a cholesteric liquid crystal material whose reflection band shifts with the change of temperature, for use in dynamic control of electromagnetic radiation in various applications.

BACKGROUND OF THE INVENTION

According to statistic data of the U.S. Department of Energy, windows typically contribute about 30 percent of overall building heating and cooling loads. Traditional windows are not optimized for energy saving. For example, in hot summer days too much sun radiation comes into a house through windows, causing great increases in the cost for air-conditioner cooling.

Solar heat gain coefficient (SHGC) is the key parameter to evaluate the energy efficiency of a window. Low SHGC windows on the current market are generally achieved by applying an invisible, spectrally selective low-emittance (low-E) coating between the panes of dual-glazed windows. In some southern states such as Texas and Georgia, building energy codes require windows to have a SHGC of 0.40 or less.

Low SHGC windows on the current market can reduce heat gain of house in summer, but also reduce beneficial heat gain from sun radiation in winter, thus the energy saving is not optimized in regions having both cold winters and hot summers. Therefore a window that may dynamically tune the transmission of sun radiation is of great global interest.

Throughout this application, the sun radiation (or solar spectrum) mainly refers to the sunlight in the wavelength range from about 300 nm to about 3 μm, which contains more than 95% of the total heat/energy of the sunlight.

There has been great interest in using variable light transmission glass or glazing to achieve electromagnetic radiation control.

Several types of chromogenic switchable glazing structures have been discovered using suspended particle devices, electrochromic effects, and certain types of liquid crystal. In general, these structures absorb or diffuse the incident light.

A polymer-dispersed liquid crystal (PDLC) has already been used for privacy-protection window in the high-end housing market. PDLC generally includes liquid crystal droplets dispersed in a polymer matrix, and works between a transparent state and an opaque scattering state depending on the refractive index match or mismatching between the liquid crystal and the polymer matrix. The opaque state may keep some heat and light out in the summer time but it also prevents the see-through view of people working in the office or staying at home. Additionally as the heat/light is scattered rather than reflected in the opaque state, some heat is still transmitted through in the summer time. The description of PDLC can be found in U.S. Pat. No. 4,994,204 (Doane et al.)

A variable light attenuating dichroic dye guest-host device as discussed in U.S. Pat. No. 6,239,778 (Palffy-Muhoray et al.) may be used for controlling the light transmission in an energy-saving window that may electronically tune the light transmission based on the different level of dye absorption. Because light is absorbed rather than reflected using this device, however, in hot summer days the temperature of the thin film may become very high and the heat may still penetrate inside the room. As a result, the dye may degrade and the reliability of the device may be an issue.

A glazing structure disclosed in U.S. Pat. No. 5,940,150 (Faris et al.) discusses an adjustable trans-reflective window that is primarily based on two layers of electrically switchable cholesteric liquid crystals (CLCs) or a combination of static cholesteric liquid crystal layers and electrically switchable liquid crystal retarder or TN cell. Their ability to reject or transmit light of one or two circularly polarized states depends on the electric stimulus applied.

All these solutions use electrical power to switch or tune the light transmission and the heat radiation. As a result, they all suffer additional cost associated with the electrical wiring in window installation.

It is highly desired to develop a smart window that selectively controls the transmission of sunlight radiation through a window structure at different times of the day and year so that thermal loading upon the heating and cooling systems of residential, commercial and industrial building environments can be minimized. It is also of a great importance that blocking the heat radiation does not have to impact the illuminating function of the sunlight and see-through view from the window. Most currently used technologies block the heat and the visible light equally. Consequently, in hot summer times, they may save energy for cooling but consume more energy for interior lighting. Furthermore, to minimize the installation cost, natural tuning that responds to temperature without the electrical wiring is of a benefit to the customer.

Thus, there is a need for a thermal tuning glazing structure that reflects sunlight when the temperature is high and transmits sunlight when the temperature is low, yet permitting a see-through view through the structure without using electrical power.

SUMMARY OF THE INVENTION

An object of the present invention is to provide a thermal tuning glazing structure which reflects sunlight at a relatively higher temperature and transmits sunlight at a relatively lower temperature, yet permitting a see-through view through the structure without continuously using electrical power.

Another object of the present invention is to provide a thermal tuning glazing structure having a reflection band that extensively shifts with the change in temperature, for improved control over the flow of electromagnetic radiation within the solar region of the electromagnetic spectrum (i.e. solar spectrum).

A further object of the present invention is to provide a thermal tuning glazing structure having a broad band of reflection that is wider than at least 200 nm, more preferably at least 300 nm, and most preferably at least 1 μm, at least at one temperature.

An advantage of the present invention is that the glazing structure is capable of energy saving in both hot and cold times, yet permitting a see-through view without continuously using electrical power.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a thermal tuning glazing structure for selectively reflecting electromagnetic radiation, said thermal tuning glazing structure comprising a first cholesteric liquid crystal (CLC) panel, the first CLC panel comprising a first CLC material, the first CLC material being in a first planar texture at least at one temperature, and having a reflection band, wherein the first planar texture has a pitch that changes when temperature varies between a first higher temperature and a second lower temperature, the reflection band has a bandwidth of at least 200 nm at the first higher temperature, and the center wavelength of the reflection band shifts to a longer wavelength when the temperature decreases to the second lower temperature.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 3A schematically shows a spectral response of the CLC panel shown in FIG. 1.

FIG. 3B schematically shows a spectral response of the CLC panel shown in FIG. 2.

DETAILED DESCRIPTION OF THE INVENTION

Figure 2:
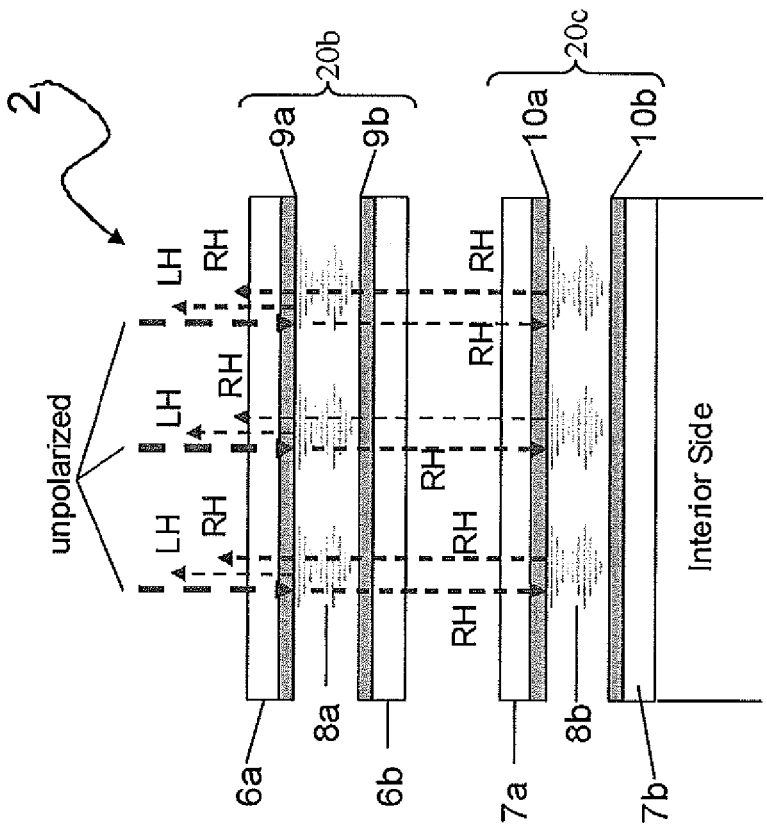
FIG. 2 schematically shows a thermal tuning glazing structure having two CLC panels having thermal tuning of the reflection band and reflecting incident light of both left-handed and right-handed circularly polarized states according to the present invention.

The following is a detailed description of the preferred embodiments of the invention, reference being made to the drawings in which the same reference numerals identify the same elements of structure in each of the several figures.

Reference will now be made to the accompanying drawings, which assist in illustrating the various pertinent features of the present invention. Although the present invention will now be described primarily in conjunction with windows, it should be expressly understood that the present invention may be applicable to other applications where it is desired to control the transmissivity or reflectivity of a substrate. In this regard, the following description of a window is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Referring now to the accompanying Drawings, two illustrative embodiments of the intelligent thermal-tuning glazing structure of the present invention will be described in great detail.

Figure 1:
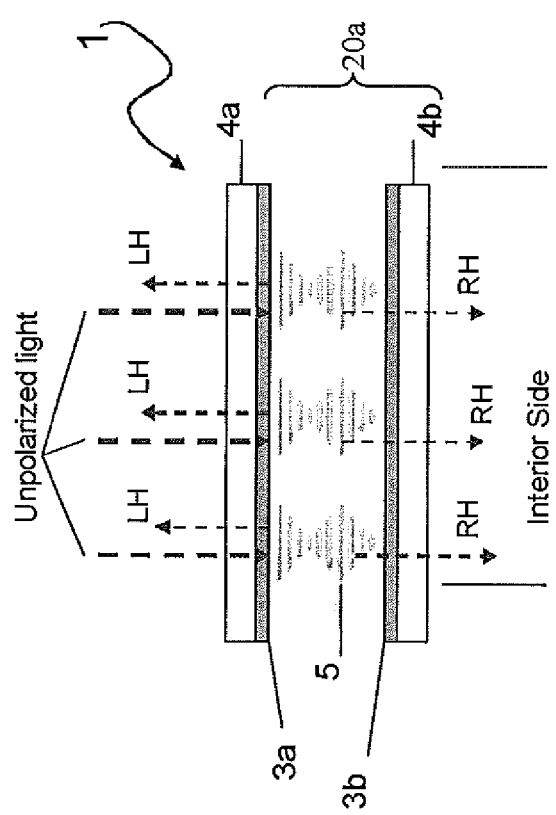
FIG. 1 schematically shows a thermal tuning glazing structure having a cholesteric liquid crystal (CLC) panel having thermal tuning of the reflection band and reflecting light of one circularly polarized state according to the present invention.

FIGS. 1 and 2 show a generalized embodiment of the intelligent thermal tuning glazing structure (i.e. window structure) of the present invention. Typically, the interior space or volume functions as a form of human habitat, although there may be applications in which this is not the case. Preferably, the intelligent thermal tuning window structure can be used in residential house, office building, and factory or transportation vehicles including automobiles, airplane, and ships. In such preferred applications, the function of the thermal tuning window structure will be to selectively control the flow of electromagnetic radiation through its thermal tuning glazing structure and into the interior space, in order to minimize or reduce energy consumption of the heating/cooling system, at different environmental temperatures or different seasons, winter or summer.

As shown in FIG. 1, a thermal tuning glazing structure 1 according to the first illustrative embodiment of the present invention comprises a cholesteric liquid crystal (CLC) panel 20a, the CLC panel 20a comprising a CLC material 5, the CLC material 5 being in a planar texture at least at one temperature, and having a reflection band, wherein the first planar texture has a pitch that changes when temperature varies between a first higher temperature and a second lower temperature, the reflection band has a bandwidth of at least 200 nm at the first higher temperature, the center wavelength of the reflection band is in a range of between 400 nm and 900 nm at the first higher temperature, and the center wavelength of the reflection band shifts to a longer wavelength when the temperature decreases to the second lower temperature. Typically the first higher temperature is between 25-65° C., and the second lower temperature is between 0-24.9° C. Note that the interior side of the thermal tuning glazing structure is not shown in FIG. 1.

Throughout this application, the first higher temperature and the second lower temperature are used to explain the working principle of this invention. The working temperature range using the present invention can be larger or smaller than the range defined by the first and second temperatures.

When the temperature further decreases below the second lower temperature, the CLC material 5 may evolve to a non-cholesteric phase, such as a smectic liquid crystal phase (not shown in FIG. 1) that does not have a reflection band, or remain in a planar structure with further shining of its reflection band to a longer wavelength.

A layer of the CLC material 5 is sandwiched between a pair of substrates 4a and 4b. The planar texture of the CLC material can be achieved by a variety of methods. As is well known, a CLC can be in a planar, focal conic, or homeotropic texture depending on surface alignment, external fields and other factors. The planar texture is characterized by a helical structure with its axis more or less perpendicular to the substrates. In one method, the planar texture can be achieved by adding two alignment layers 3a and 3b to substrates 4a, 4b, respectively. Alignment layers 3a and 3b can be, but not limited to, spin-coated polyimide materials. At least one of the two alignment layers 3a and 3b has homogeneous alignment or planar alignment for stabilizing the planar structure of the CLC layer, to avoid strong scattering that prevents the see-through view of the window. As long as one alignment layer stabilizes well the planar structure of the CLC material, the other alignment layer may not be necessary. In another method, alignment layers 3a and 3b may provide alignment other than homogenous alignment near the substrate-liquid crystal surface. However, the bulk of the CLC can be set in a planar texture, through any known means including pressing the panel.

In yet another method, when the liquid crystals have negative dielectric anisotropic, all the alignment layers 3a, 3b, 9a, 9b, 10a, 10b may be replaced by conductive ITO layer, and an electric filed may be applied in the layer of the CLC material in fabrication process to create the planar CLC structure. After the fabrication, no electric field is needed to maintain the planar texture.

Regardless of which method is used, when the CLC panel is in operation, the CLC material is in a planar texture at least at one temperature, or at least the bulk of the CLC material is in a planar texture. The planar texture may be further separated into many domains if alignment layers do not provide uniform homogeneous alignment across the entire panel, but instead only provide more or less uniform homogeneous alignment in each domain.

The thermal tuning glazing structure 1 is securely supported within a prefabricated window frame (not shown in FIG. 1), which can be realized using virtually any suitable material such as plastic, metal, rubber, wood or composite material.

In one example, CLC material 5 comprises a liquid crystal (LC) and a chiral dopant. It may also optionally include a polymer (or monomer before polymerization). The polymer material can be obtained through any known methods including but not limited to UV light induced polymerization of the monomers. CLC material 5 may also comprises a photoinitiator when a photo induced polymerization process is used.

The liquid crystal can be any chiral or achiral liquid crystal material, including but not limited to Merck BL006, E44 (available from E.M. Industries of Hawthorne, N.Y.), and SLC1717 (available from Slichem Liquid Crystal Material in Shijiazhuang City, Hebei province, China). Chiral dopants can be, but not limited to, Merck ZLI-811, R1011 (available from E.M. Industries of Hawthorne, N.Y.), and propane-1,2-di-(4-(4-heptylcyclohexyl) benzoate) (PPCB).

As is well known, a CLC can be formed by rod-like molecules whose directors are in a self-organized continuously rotated helical structure in the planes perpendicular to the helical axis. The periodic helical structure results in a selective reflection band caused by a periodic modulation of the refractive index. Within the band, the circularly polarized incident light with the same twist sense as the cholesteric helix is reflected, while the circularly polarized incident light with the opposite twist sense is transmitted. Outside of this selective band, light of both polarizations are essentially transmitted. The fundamental physics and optics of cholesteric liquid crystals is summarized in "The physics of liquid crystals", P. 263-267, second edition, Oxford Science Publications (1993) by De Gennes, P. G. and Prost, J.

It is well known that when a nematic liquid crystal is doped with a chiral dopant to form a CLC structure, the helical pitch length P is determined by the helix twist power (HTP) of the chiral dopant based on the following equation:

$$p = \frac{1}{HTP \times C}, \quad (1)$$

where C is the concentration of the chiral dopant.

The reflective bandwidth of the cholesteric liquid crystal is determined by: $(n_e - n_o)p$, where $n_e$ and $n_o$ are the extraordinary and ordinary refractive indices of the LC, respectively.

The center wavelength of the reflection band is determined as $$\lambda_c = \frac{(n_e + n_o)p}{2} = \bar{n}p, \text{ where } \bar{n} = \frac{(n_e - n_o)}{2}$$

is the average refraction index of the liquid crystal.

In a case where the liquid crystal is chiral, the dopant may not be necessary as long as the pitch of the CLC is the same as designed by using a nematic liquid crystal and a chiral dopant.

There are various ways to thermally tune the reflection band of the CLC, including using dependency of the LC's phase transition or the temperature-dependent birefringence and refraction index of the LC. These methods are discussed by:

Li et al. in "Temperature effect on liquid crystal refractive indices," J. Appl. Phys. 96, 19-24, 15; and Zhang et al. in "Temperature dependence of pitch and twist elastic constant in a cholesteric to smectic A phase transition," Liq. Cryst. 29, 1497-1501 (2002).

None of these methods has been used or proposed for energy saving windows.

FIG. 3A shows ideal transmission curves of the CLC texture shown in FIG. 1 of the present invention, curve (a) for a relatively higher temperature T1, and curve (b) for a relatively lower temperature T2, where T1>T2. The spectrum of sunlight radiation, or the solar spectrum, in arbitrary units, is also shown in FIG. 3A for illustrating the principle of the energy saving function of the intelligent thermal tuning glazing structure of the present invention. Because the layer of CLC material 5 primarily reflects the circularly polarized light with the same twist sense of the CLC, when approximately unpolarized light is incident on structure 1 of FIG. 1 of the present invention, the transmission of the incident light with all polarization directions is high, ideally 100%, except at the reflection band, where the total transmission is low, ideally 50%. The ideal transmission can be achieved if an anti-reflection layer is added to remove reflection at the air-substrate surface.

Shown in FIG. 1, as an example, the layer of CLC material 5 has a twist sense of left-handedness (LH), thus the circularly polarized light of LH is reflected and circularly polarized light of right-handedness (RH) is transmitted.

Alternatively, the layer of CLC material 5 can have a twist sense of RH (not shown in FIG. 1). As a result, the circularly polarized light of RH is reflected while circularly polarized light of LH is transmitted.

At the low temperature T2 such as in winter time, the reflection band 30 moves away from the wavelength range that contains most energy of sunlight radiation, thus sunlight is allowed to pass through the window to provide both the illuminating visible light and the heat into the interior of a building. When the temperature increases, the reflection band 30 moves toward a shorter wavelength range. The higher the temperature, the more heat from the sunlight radiation is reflected and blocked. In warm days where heating is not necessary, the reflection band 30 of curve (a) may reflect and block light/heat at near infrared (NIR) range, while it still passes through most visible light for illuminating the interior space of a building and allows a full see-through view. In hot summer days when air-conditioner is used, the reflection band 30 may shift more toward a shorter wavelength range to block most NIR and some red light. When red visible light is reflected, the window may look bluish. However the see-through view is still allowed. It may be also beneficial for people working in an office building to look through a bluish window into the sky, and get a refreshing feeling, even when the sky is not blue.

The thermal tuning glazing structure 1 in FIG. 1 has one layer of the CLC, thus the maximum reflection at the reflection band shown in FIG. 3A is 50%.

As shown in FIG. 2, a thermal tuning glazing structure 2 according to the second illustrative embodiment of the present invention comprises two cholesteric liquid crystal (CLC) panels 20b, 20c. Much like the CLC panel 20a, the CLC panel 20b comprises a CLC material 8a, while the CLC panel 20c comprises a CLC material 8b. Each of the CLC materials 8a, 8b are in a planar texture at least at one temperature, having a pitch that changes when the temperature varies between a first higher temperature and a second lower temperature, and having a reflection band, wherein the reflection band has a bandwidth of at least 200 nm at the first higher temperature, the center wavelength of the reflection band is in a range of between 400 nm and 900 nm at the first higher temperature, and the center wavelength of the reflection band shifts to a longer wavelength when the temperature decreases to the second lower temperature.

A layer of CLC material 8a is sandwiched between a pair of substrates 6a and 6b, which are optionally coated with alignment layers 9a and 9b. Similarly, a layer of CLC material 8b is sandwiched between a pair of substrates 10a and 10b, which are also optionally coated with alignment layers 10a and 10b. Alignment layers 9a, 9b, 10a, 10b may be, but not limited to, spin-coated polyimide materials.

In one example, at least one of the two alignment layers 9a and 9b has homogeneous alignment for stabilizing the planar structure of the layer of CLC material 8a. Also at least one of the two alignment layers 10a and 10b has homogeneous alignment for stabilizing the planar structure of the layer of CLC material 8b. As long as one of alignment layers 9a and 9b may stabilize well the planar structure of CLC layer, the other alignment layer may not be necessary. Likewise, when one of alignment layers 10a and 10b may stabilize well the planar structure of CLC layer, the other alignment layer may not be necessary.

In another example, none of alignment layers 9a, 9b, 10a, 10b is applied. Instead, the planar texture of the CLC materials 9a, 9b is stabilized by any other known methods including using a low concentration of polymer network, using a flow-induced alignment, or pressing the panel.

According to one example, the layers of CLC materials 8a and 8b have opposite twist sense. As an example shown in FIG. 2, the layer of CLC material 8a has twist sense of LH and 8b has twist sense of RH. Alternatively, the layer of CLC material 8a has twist sense of RH and 8b has twist sense of LH. A stack of the double CLC materials 8a, 8b reflects light of both left-handed and right-handed circularly polarized states within the reflection band from unpolarized incident light.

According to another example, the layers of CLC materials 8a and 8b have the same twist sense of either LH or RH. A broad band half wave retarder (or retardation film) is placed between the two CLC panels 20b, 20c. A stack of CLC materials 8a, 8b and the half wave retarder reflects light of both left-handed and right-handed circularly polarized states within the reflection band.

Similar to FIG. 3A, FIG. 3B shows ideal transmission spectral curves of the stack of two CLC panels shown in FIG. 2 of the present invention, curve (a) for a relatively higher temperature T1, and curve (b) for a relatively lower temperature T2, where T1>T2. The reflection band 30 shills towards shorter wavelength with the increasing temperature. Spectrum of sun radiation is for comparison to understand the energy saving of the CLC structure. As discussed referring to FIG. 2, the minimum transmission in FIG. 3B is nearly 0% in the reflection band as opposed to the minimum transmission of near 50% in FIG. 3A.

When the substrates 6a, 6b, 7a, 7b are made of glass, ideally there is an air-gap between substrates 6b and 7a, to optimize the thermal shielding, similarly to those in the double-panel glass windows in the current market. The thickness of the substrates is usually at least 2 mm, greater than that of a conventional liquid crystal display.

Figure 4:
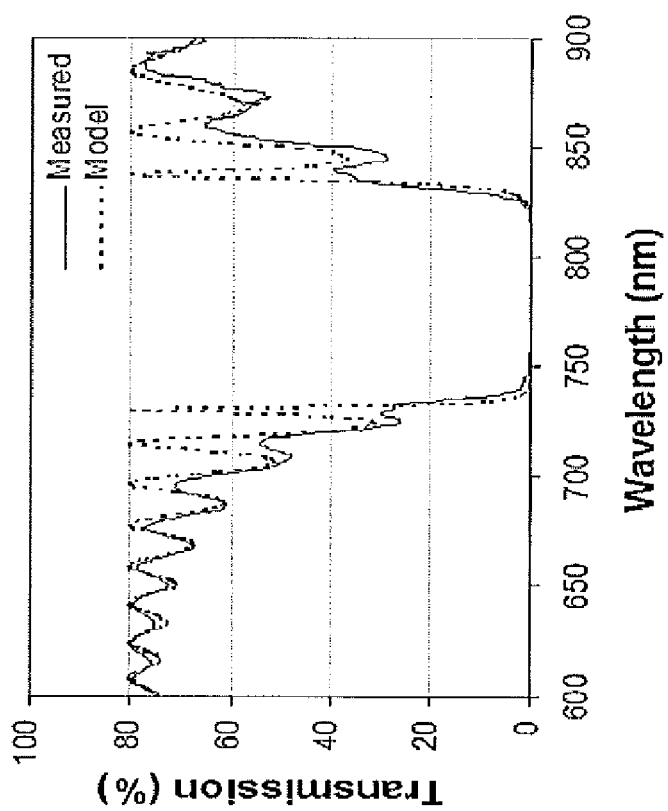
FIG. 4 shows a standard spectral response of a conventional CLC film with a notch reflection band.

FIG. 4 shows a standard spectral response of a CLC film with a notch reflection band, as discussed by Gu et al. in "Dual Frequency Liquid Crystal Devices for Infrared Electro-Optical Applications", SPIE Proc. 4799, 37-47 (2002). No anti-reflection coating is applied on the substrates. This standard spectral response of a CLC film has a bandwidth that is only about 100 nm, falling short of meeting the targeted bandwidth of at least 200 nm to be useful in energy saving in a window.

As described in FIG. 3, the bandwidth of the CLC material needs to be more preferably at least 1 micron, and most preferably at least 2 microns at the higher temperature, in order to optimize the energy saving. Thus, conventional CLC materials cannot be easily adopted in an intelligent window. The choice of liquid crystals and chiral dopants becomes critical to the thermal tuning glazing structure of the present invention. One of the key features of the present invention is that the CLC material 5, 8a, 8b has a wide tuning range of pitch, enabling a broad reflection band.

Methods and examples of achieving a thermal tuning broad band reflection are described below.

Shift in the Center Wavelength of the Reflection Band

First, methods and examples of shifting the center wavelength of the reflection band of the CLC material by at least 400 nm based on temperature change are described below.

In one method, a CLC material comprising a left-handed chiral dopant ZLI-811 mixed in a nematic liquid crystal (LC) host BL006 is used to thermally tune the center wavelength of the reflection band. The twisting power of the chiral dopant increases with increasing temperature. Additionally, the concentration of the chiral dopant at a relatively higher temperature is higher than the maximum soluble concentration at a relatively lower temperature. The twisting power of the dopant decreases due to the precipitation and aggregation of the chiral dopant at the lower temperature, however the twisting power increases with the increasing temperature due to the higher solubility of chiral dopant at the higher temperature. Consequently, the center wavelength shifts from a relatively longer wavelength to a relatively shorter wavelength as the temperature increases. The change in the center wavelength is more than 400 nm when the temperature changes only a few degrees Centigrade.

Figure 5:
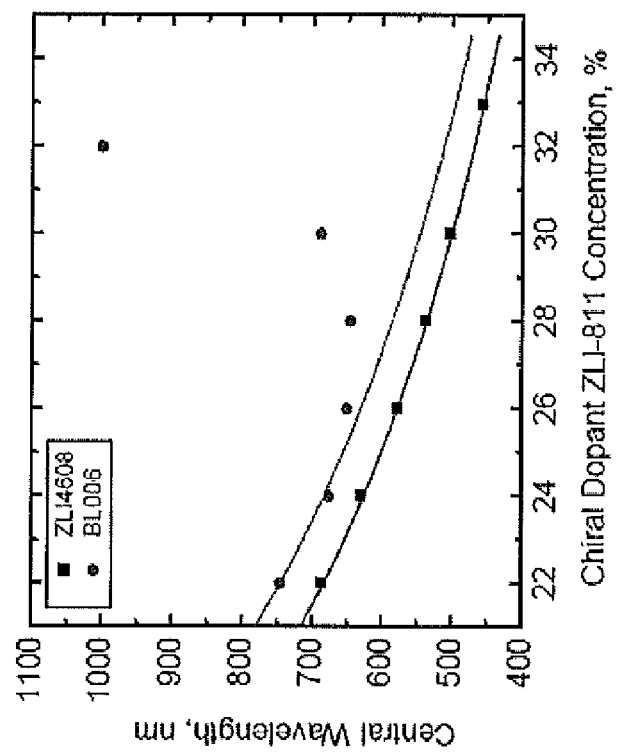
FIG. 5 shows redshift of the central wavelength of the reflection band of a CLC made of chiral dopant ZLI-811 in liquid crystal BL006 when the concentration of ZLI-811 exceeds a critical concentration.

According to Huang et al. (See "Tuning photonic band gap in cholesteric liquid crystals by temperature-dependent dopant solubility", Opt. Express 14, 1236-1242 (Feb. 6, 2006)), FIG. 5 shows measured results (thick line) and calculated results (squares) of central wavelength of a CLC sample comprising chiral dopant ZLI-811 in liquid crystal BL006, and measured results (thin line) and calculated results (circles) of central wavelength of a CLC sample comprising chiral dopant ZLI-811 in liquid crystal ZLI4608. The measured results from ZLI-811 in liquid crystal ZLI4608 matches well with the calculated results based on equation (1), reflecting that the pitch of a CLC is normally determined by the concentration of the chiral dopant.

The measured results of ZLI-811 in liquid crystal BL006, however, does not match well with equation (1) when the concentration of ZLI-811 is more than a maximum soluble value, which is approximately 24% in BL006. The reason for this is that a portion of ZLI-811 molecules will precipitate from the BL006 host and aggregate when the concentration of ZLI-811 is more than the maximum soluble value. The aggregation attracts some chiral molecules from the LC host, which in turn, results in a lower effective chiral concentration and consequently an increased pitch. As a result, the central reflection wavelength shifts toward a longer wavelength. When temperature increases, the solubility of the chiral dopant in the LC also increases, which shortens the pitch length of the CLC's helix, thus blue shift of the center of the reflection band is observed with an increase in temperature.

Figure 6:
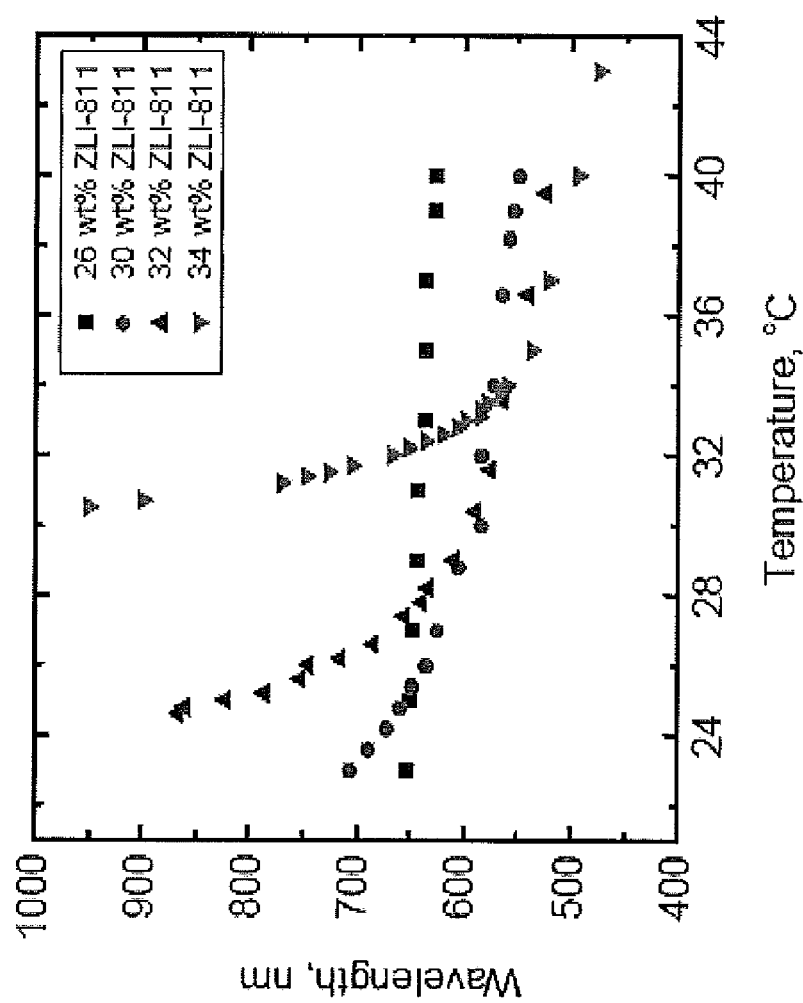
FIG. 6 shows that CLC samples made of ZLI-811 and BL006 produce blue shift as the temperature increases.

FIG. 6, also discussed in the above Huang's article, shows that CLC samples with various levels of concentration of ZLI-811 in BL006 produce blue shift as temperature increases. The central wavelength of the reflection band has wide tuning range when concentration of ZLI-811 in BL006 is more than 32%.

Conceivably, in the above example referring to FIG. 5 and FIG. 6, a small amount of second chiral dopant can be mixed with the dominating chiral dopant ZLI-811. The twisting power of the second chiral dopant does not change with temperature, or is insensitive to the change in temperature. The second chiral dopant decreases the twisting power of the dominating chiral dopant and brings red shift of the reflection band equally at nearly every temperature.

While the CLC material disclosed in the Huang's article shows a wide tuning range for the central wavelength of the reflection band, however, the disclosed CLC alone is not sufficient to enable the thermal tuning glazing structure of the present invention.

In another method, as discussed by Pan et al. (see "A polymer stabilized liquid crystal film with thermal switching characteristics between light transmission and adjustable light scattering", Optical Materials, Volume 31, Issue 8, June 2009, 1163-1166), the twisting power of chiral dopant PPCB (available from Jiangsu Hecheng Chemical Materials Co., Ltd, Jiangsu, China) decreases first with increasing temperature, becomes zero at a critical temperature, and then the twisting sense changes and the twisting power increases when the temperature further increases above the critical temperature. The critical temperature of PPCB in this example is about 314 K (or 41° C.). When PPCB is mixed with another right-handed chiral dopant R811 from Merck, a large pitch change is achieved with the change in temperature. The chiral dopant R811 is known to have the same twist sense of RH at all temperatures. Thus, PPCB and R-811 have the same twist sense at a temperature above the critical temperature and opposite twist sense at a temperature below the critical temperature.

Figure 7:
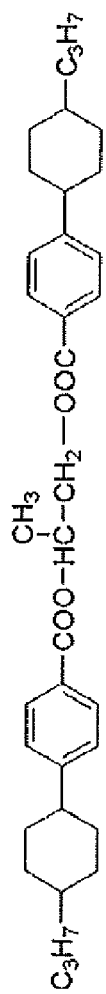
FIG. 7 shows the chemical structure of the chiral dopant PPCB that converts its twist sense at a critical temperature.

FIG. 7 shows the chemical structure of PPCB.

Figure 8B:
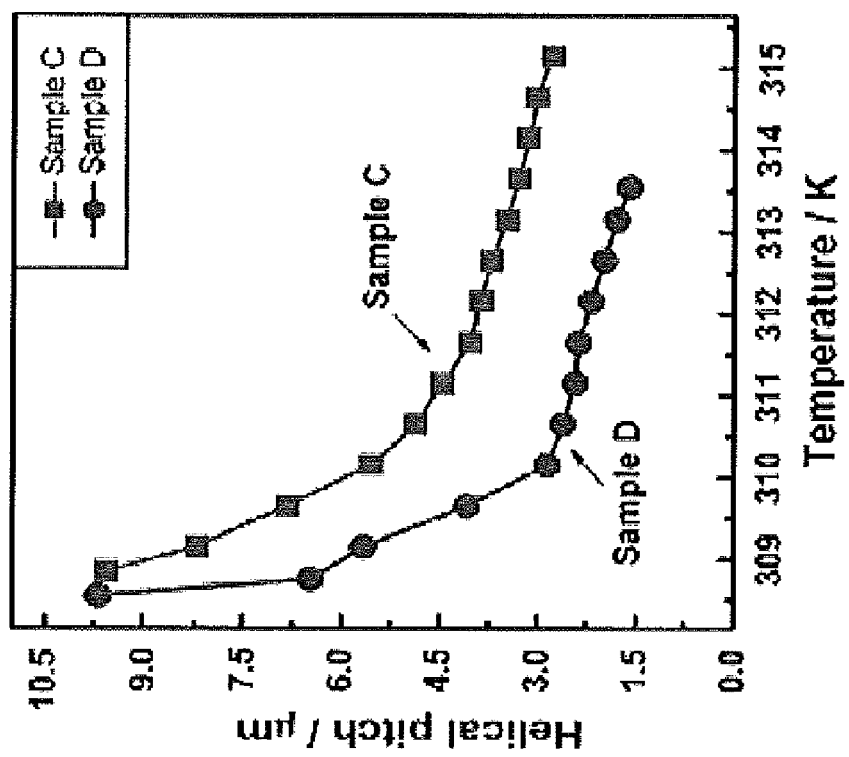
FIGS. 8A-8B show plots of temperature versus pitch length of CLC for four samples including PPCB.
Figure 8A:
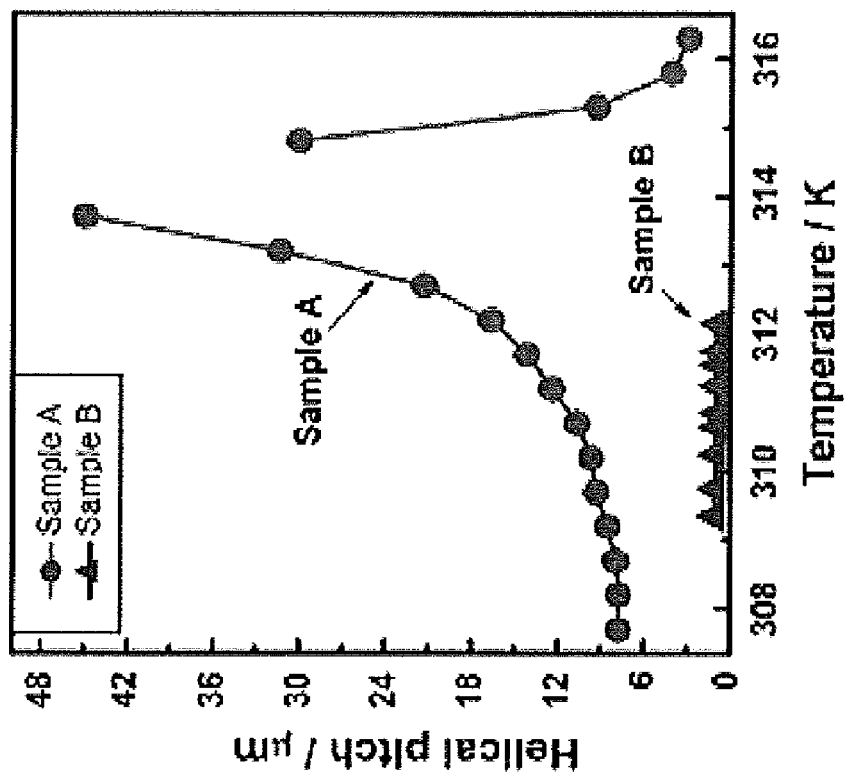

FIG. 8 shows plots of temperature versus pitch length for (a) samples A and B and (b) samples C and D, at different temperatures. Sample A has 10% of PPCB in liquid crystals, and the twist sense changes at a critical temperature of about 314 K. Sample B has 10% of R811 in liquid crystals. Sample C has 7.5% of PPCB and 2.5% of R811, while D has 6.5% of PPCB and 3.5% of R811. The liquid crystals used are SLC1717 and a SmA liquid crystal mixture. Sample C and D demonstrated a big tuning range of pitch with the temperature.

According to the above article by Pan et al., a homeotropic polymer network was used to stabilize the liquid crystal materials. When the pitch decreases greatly, the light transmission is greatly reduced because of the intensive light scattering from the focal conic structure. Again, the see-through view is not enabled because of the strong light scattering.

In contrast, according to the present invention, the CLC material comprising the chiral dopant PPCB or any other chiral dopant with similar temperature-dependent twist-sense conversion and one or more suitable liquid crystals is arranged in a planar structure (vs. a homeotropic structure or focal conic structure) by means including using homogeneous alignment or a planar polymer network. This provides another method to expand the tuning range of the center wavelength of the CLC for an energy saving window.

Broad Reflection Band

Second, the CLC of the present invention must have a broad reflection band as discussed earlier. Since the birefringence, or $n_e$-$n_o$, of commercially available liquid crystal materials is smaller than 0.4, the bandwidth is less than 200 nm in the visible spectrum (380 nm to 750 nm), and less than 400 nm in NIR (from about 800 nm to about 2500 nm), which are not large enough for an application in energy saving windows.

A reflection band of at least 200 nm, more preferably at least 300 nm, and most preferably at least 1 μm useful for the thermal tuning glazing structure of the present invention can be achieved in the following methods/examples.

In one example, a broad reflection band can be achieved by using a UV-intensity gradient to create a pitch gradient across the film thickness, as discussed by Broer et al. (see "Wideband reflective polarizers from cholesteric polymer networks with a pitch gradient", Nature 1995, 378, 467-469; and "Photo-Induced Diffusion in Polymerizing Chiral-Nematic Media", Adv. Mater. 1999, 11, 573-578). A polymer network is used to stabilize the pitch gradient induced by the gradient of UV intensity or gradient of temperature during the polymerization process. The stabilized pitch gradient greatly increases the reflection bandwidth, thus enabling the optimization of the energy saving of a window.

In another example, a polymer-stabilized cholesteric liquid crystal (PSCLC) prepared under specific methods also increased the reflection bandwidth, as disclosed by Binet et al. in "Switchable broadband light reflection in polymer-stabilized cholesteric liquid crystals", J. Appl. Phys., 2001, 90, 1730-1734;

In yet another example, Guo et al. (see "Effect of Specific Rotation of Chiral Dopant and Polymerization Temperature on Reflectance Properties of Polymer Stabilized Cholesteric Liquid Crystal Cells", Journal of Polymer Science: Part B: Polymer Physics, Vol. 46, 1562-1570 (2008)) demonstrated broadening of the reflection band of CLC in a series of PSCLC cells by photo-polymerization of a CLC mixture comprising of a nonreactive LC, a nematic diacrylate and a chiral cholesteryl monomer. The reflection band was broadened after polymerization due to an inhomogeneous distribution of the chiral polymer network within the cells. Also the reflection band was located in the range from visible to the near IR by adjusting the concentration of the chiral dopant.

Figure 9:
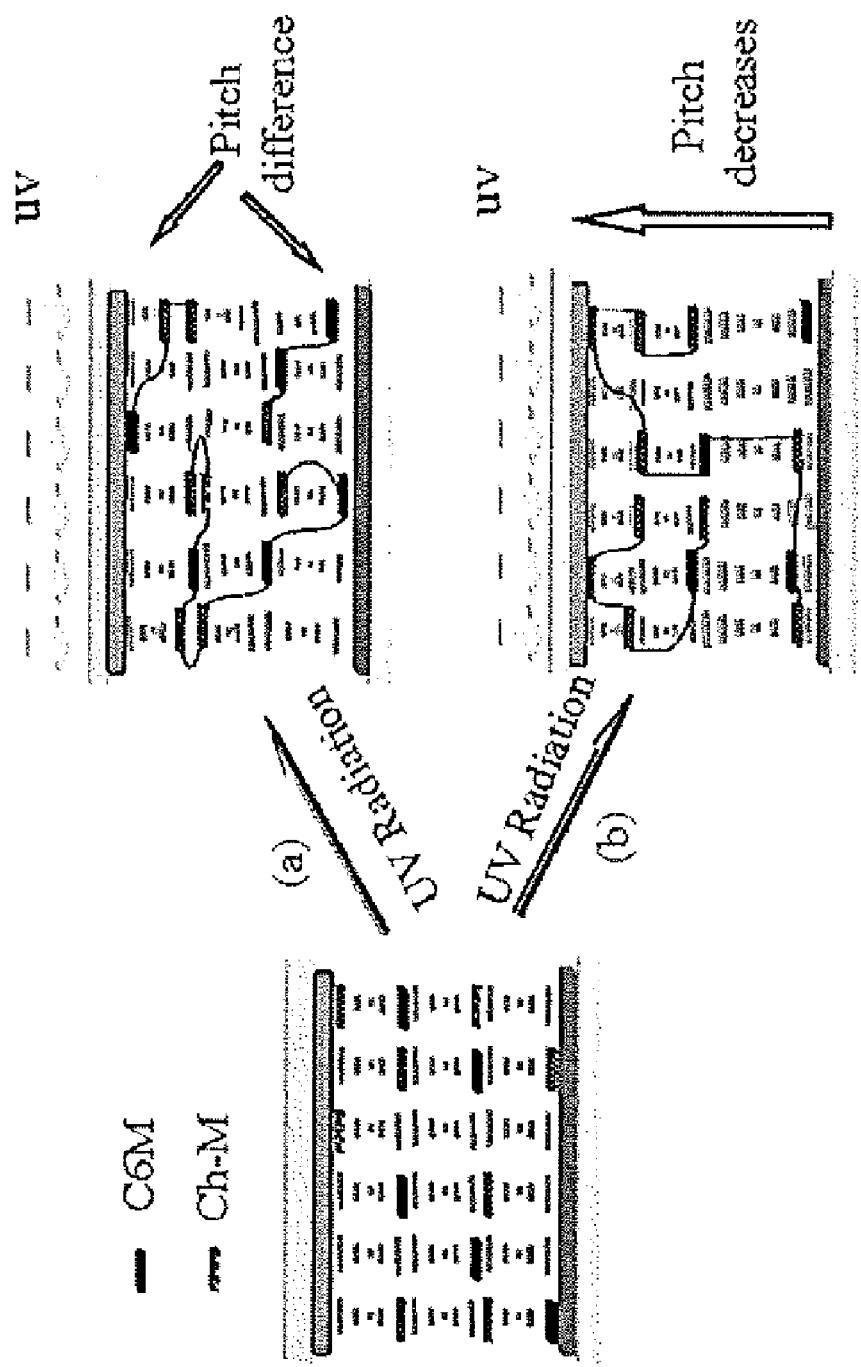
FIG. 9 schematically shows the mechanism of expanding the pitch distribution in a sample after polymerization of a chiral monomer.
Figure 10:
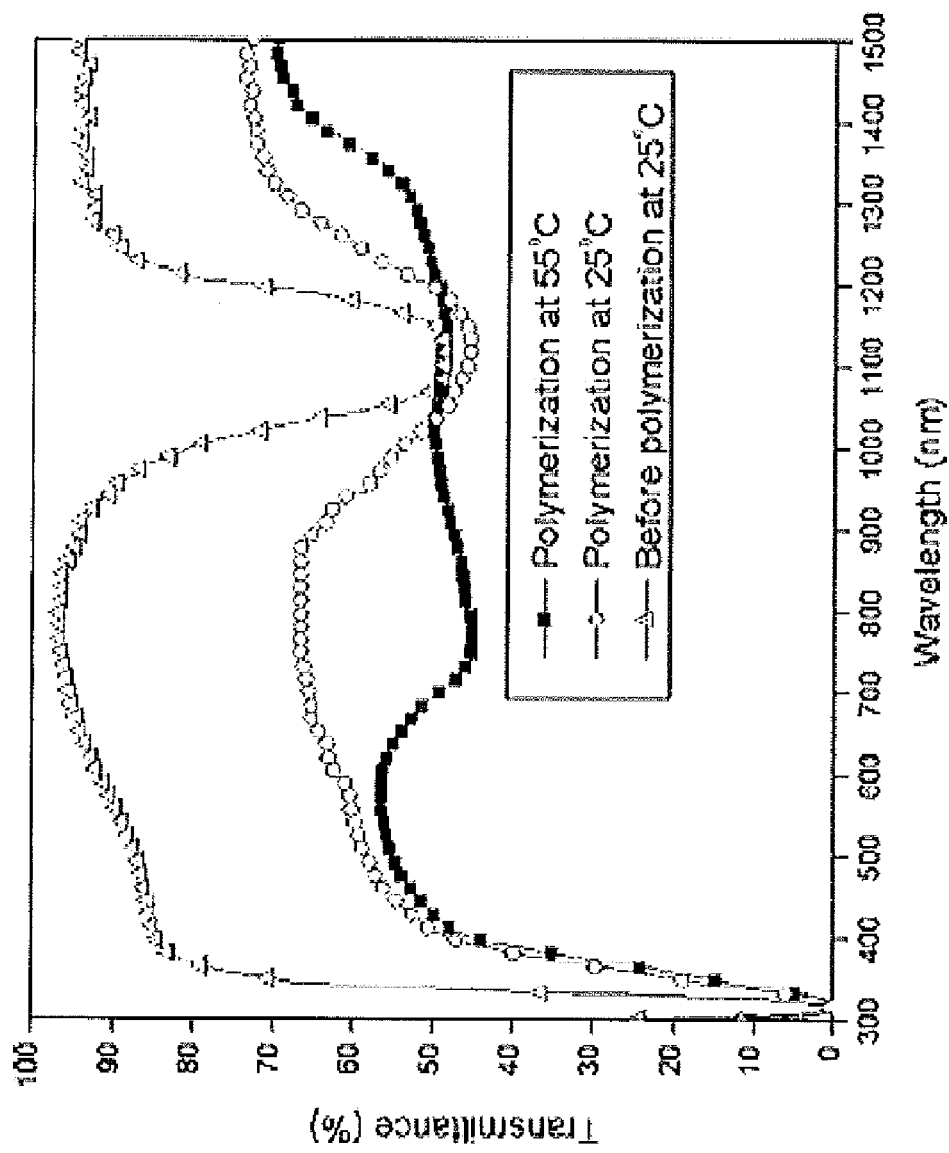
FIG. 10 shows transmission spectra of polymer stabilized CLC (PSCLC) samples investigated under different polymerization temperatures.

FIG. 9 and FIG. 10 are described in Guo's work. FIG. 9 shows schematic description of the mechanism of expanding the pitch distribution in the CLC sample after polymerization of a chiral monomer. Nematic LC, SLC-1717 (from Slichem Liquid Crystal Material), the chiral dopant, S811 and R1011 (from Merck), and the photo-initiator, 2,2-dimethopxy-1,2-diphenyl-ethanone (also called IRG651, available from TCI (Shanghai) Development Co., Ltd., shanghai, China, were used. The LC diacrylate monomer, C6M was synthesized according to a method suggested by Broer as discussed in "In-situ photopolymerization of oriented liquid-crystalline acrylates", Chem. 1989, 190, 2255-2268. The chiral monomer (Ch-M) was prepared according to a method discussed by Guo et al. in "Reflectance properties of polymer-stabilised cholesteric liquid crystals cells with cholesteryl compounds of different functionality", Liq. Cryst. 35(1): 87-97 (2008).

FIG. 10 shows the transmission spectra of the PSCLC samples investigated under different polymerization temperatures. The transmission spectra were measured using an unpolarized light source. Samples before polymerization and after polymerization at 25° C. and 55° C. were tested. Samples after polymerization at 55° C. demonstrated a wide reflection band, from about 700 nm to about 1400 nm. This reflection band thus had a bandwidth of about 700 nm, which is useful in the thermal tuning glazing structure of the present invention.

One or more of the methods discussed in the above examples or any other known method can be used to prepare a CLC material such that the reflection band is wide enough to be useful in the thermal tuning glazing structure according to the present invention.

Once the thermal tuning glazing structure is made, it can be supported within a prefabricated window frame to provide an intelligent window system for installation within a house or office building, or aboard a transportation vehicle such as an airplane or automobile.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 1 thermal tuning glazing structure having a cholesteric liquid crystal (CLC) panel
2 thermal tuning glazing structure having two CLC panels
3a, 3b alignment layer
4a, 4b substrate
5 cholesteric liquid crystal
6a, 6b, 7a, 7b substrate
8a, 8b cholesteric liquid crystal
9a, 9b, 10a, 10b alignment layer
20a, 20b, 20c CLC panel
30 reflection band

What is claimed is:

1. A thermal tuning glazing structure for selectively reflecting electromagnetic radiation, said thermal tuning glazing structure comprising a first cholesteric liquid crystal (CLC) panel, the first CLC panel comprising a first CLC material, the first CLC material being in a first planar texture at least at one temperature, and having a reflection band, wherein the first planar texture has a pitch that changes when temperature varies between a first higher temperature and a second lower temperature, the reflection band has a bandwidth of at least 200 nm at the first higher temperature, and the center wavelength of the reflection band shifts to a longer wavelength when the temperature decreases to the second lower temperature.

2. The thermal tuning glazing structure of claim 1, wherein the planar texture of the first CLC material is stabilized by homogeneous surface alignment and/or a planar polymer network.

3. The thermal tuning glazing structure of claim 1, wherein the first CLC material comprises at least a liquid crystal host and a first chiral dopant, wherein the twist sense of the first chiral dopant changes at a critical temperature, the critical temperature being between the first higher temperature and the second lower temperature.

4. The thermal tuning glazing structure of claim 3, wherein the first CLC material further comprises a second chiral dopant, wherein the twist sense of the second chiral dopant does not change when the temperature varies between the first higher temperature and the second lower temperature.

5. The thermal tuning glazing structure of claim 4, wherein the first and second chiral dopants have an opposite twist sense at a temperature that is below the critical temperature, and have the same twist sense at a temperature that is above the critical temperature.

6. The thermal tuning glazing structure of claim 1, wherein the first CLC material comprises at least a first liquid crystal host, and a first chiral dopant that has a concentration more than its maximum soluble concentration in the first liquid crystal host at the second lower temperature, wherein the first chiral dopant precipitates from the first liquid crystal host and aggregates at the second lower temperature, and the maximum soluble concentration of the first chiral dopant in the first liquid crystal host increases with the temperature.

7. The thermal tuning glazing structure of claim 6, wherein the first CLC material further comprises a second chiral dopant that has a concentration lower than the first chiral dopant, wherein the first and second chiral dopants have an opposite twist sense.

8. The thermal tuning glazing structure of claim 1, wherein the planar texture has a pitch gradient.

9. The thermal tuning glazing structure of claim 1, wherein the reflection band and the solar spectrum overlap at the first higher temperature.

10. The thermal tuning glazing structure of claim 1, wherein the first planar texture reflects light of a circularly polarized state within the reflection band.

11. The thermal tuning glazing structure of claim 1 further comprising a second CLC panel, wherein the second CLC panel comprises a second CLC material, the second CLC material being in a second planar texture at least at one temperature, the second planar texture having a pitch that changes when the temperature varies between the first higher temperature and the second lower temperature.

12. The thermal tuning glazing structure of claim 11, wherein at the first higher temperature, the first planar texture reflects light of a first circularly polarized state and the second planar texture reflects light of a second circularly polarized state for some light within the solar spectrum.

13. The thermal tuning glazing structure of claim 11 further comprising a half wave retardation film located between the first and second CLC panels, wherein the two planar textures reflect light of the same circularly polarized state.

14. The thermal tuning glazing structure of claim 1, wherein the bandwidth is at least 1 μm at the first higher temperature.

15. The thermal tuning glazing structure of claim 1, wherein the center wavelength of the reflection band is at least 900 nm at the second lower temperature.

16. The thermal tuning glazing structure of claim 1, wherein the first higher temperature is between 25 and 65° C.

17. The thermal tuning glazing structure of claim 1, wherein the center wavelength of the reflection band is in a range of between 400 nm and 900 nm at the first higher temperature.

18. The thermal tuning glazing structure of claim 1, wherein below the second lower temperature, the first CLC material evolves to a non-cholesteric phase and the reflection band disappears.

19. The thermal tuning glazing structure of claim 1, wherein the CLC panel comprises two glass substrates, each having a thickness of at least 2 mm.

20. The thermal tuning glazing structure of claim 1, wherein the CLC panel comprises two plastic substrates.

21. An intelligent window system for automatic electromagnetic radiation control comprising a plurality of said thermal tuning glazing structures of claim 1, each mounted within a window frame, for installation in house, office building, or aboard a transportation vehicle.

* * * * *